Sept. 26, 1933.   A. V. MERSHON ET AL   1,928,457
ELECTRIC GAUGE
Filed Sept. 12, 1929   2 Sheets-Sheet 1
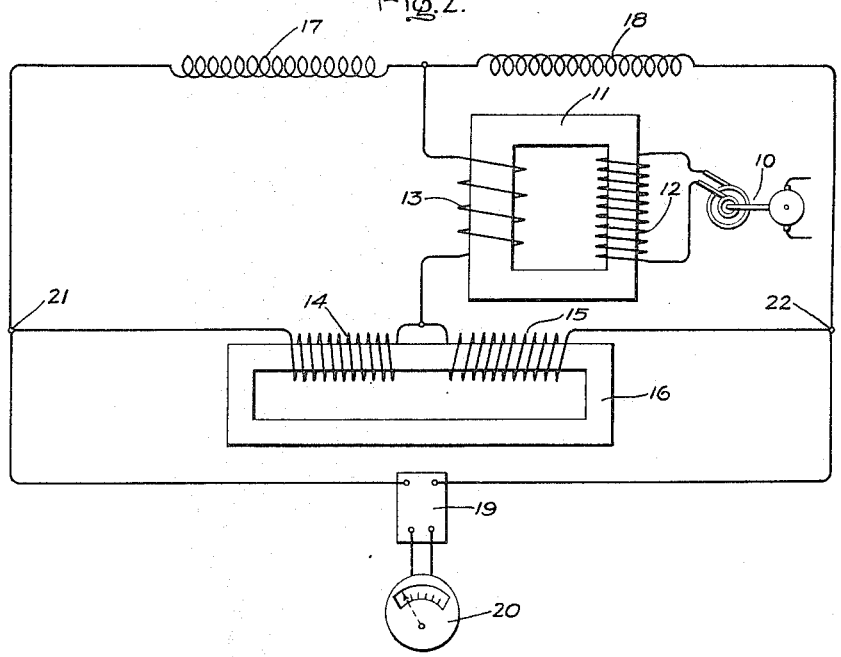
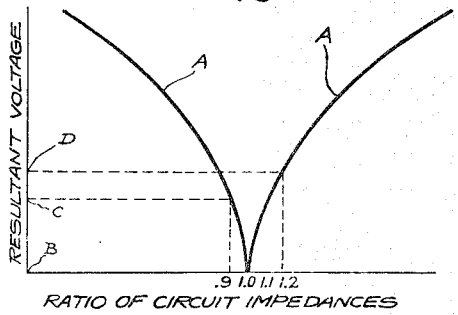
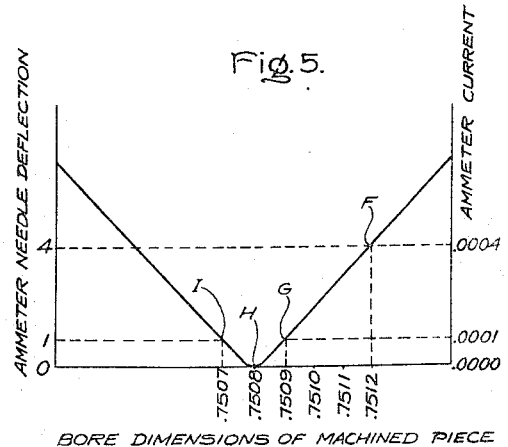
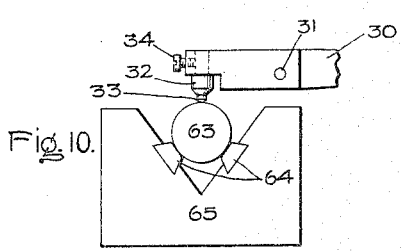
Inventors:
Alfred V. Mershon,
Benjamin C. Waite Jr.,
by Charles E. Mullo
Their Attorney.

Sept. 26, 1933.   A. V. MERSHON ET AL   1,928,457
ELECTRIC GAUGE
Filed Sept. 12, 1929   2 Sheets-Sheet 2
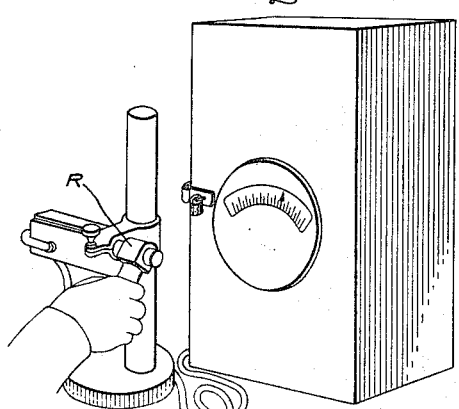
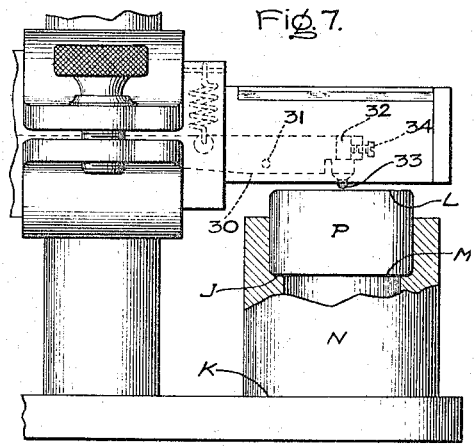
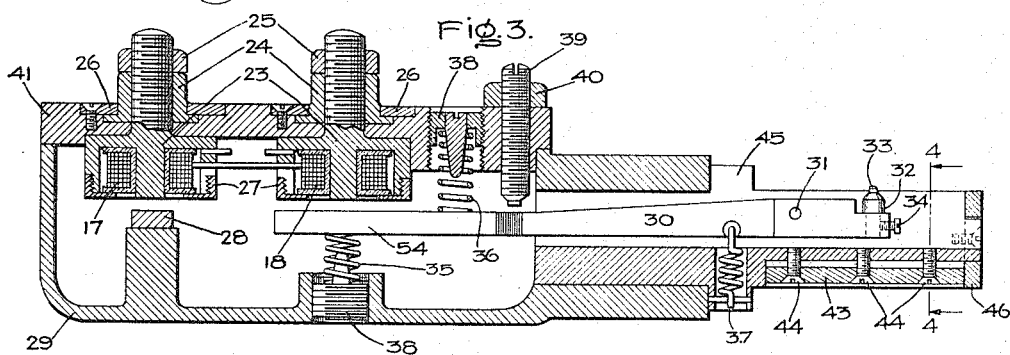
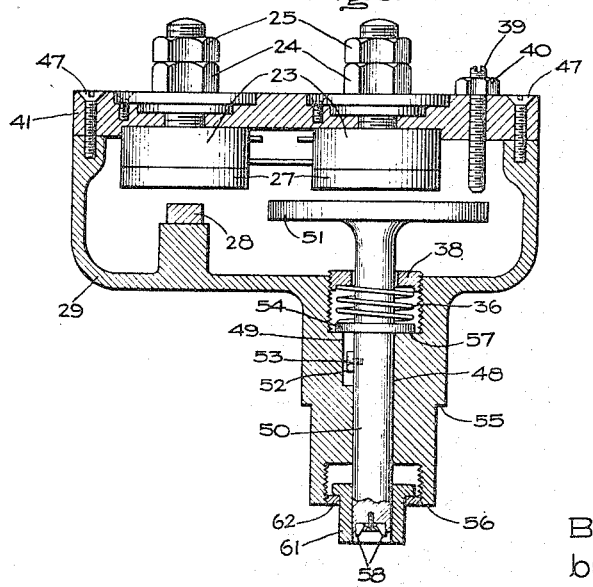
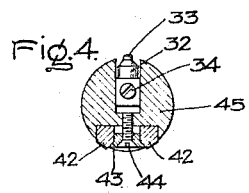
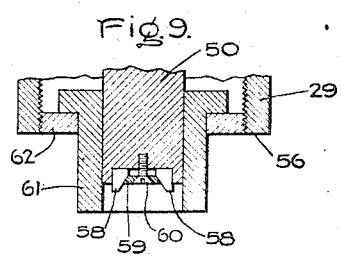
Inventors:
Alfred V. Mershon,
Benjamin C. Waite Jr,
by Charles E. Mullen
Their Attorney.

Patented Sept. 26, 1933

1,928,457

UNITED STATES PATENT OFFICE 1,928,457

ELECTRIC GAUGE

Alfred V. Mershon and Benjamin C. Waite, Jr., Schenectady, N. Y., assignors to General Electric Company, a corporation of New York Application September 12, 1929
Serial No. 392,202

9 Claims. (Cl. 177—351)

Our invention relates to a highly sensitive electrical gauge for determining inaccuracies in machined parts though such inaccuracies be very slight.

The remarkable development of high quantity production combined with precision requirements of present day manufacturing created a great demand for more accurate gauges. Many types of amplifying gauges have been placed on the market to meet this demand but they are either too slow for quantity inspection purposes, or they require a skilled operator, or the mechanism requires frequent repairs or frequent adjustments.

The device of our invention contains a minimum of moving parts so as to permit routine gauging operations to be rapidly conducted with a very high degree of accuracy and undetectable wear of the gauging surfaces over long periods of time. An inexperienced operator can perform rapid and accurate inspection with our electric gauge because it is entirely independent of the sense of human touch which is so essential in the use of most gauges. Furthermore, with our electric gauge inspection can be carried on at a rapid rate with only a small fraction of the fatigue that is usually caused by the continuous use of mechanical gauges. In carrying out our invention we take advantage of the fact that variations in the air gap of a magnetic circuit cause a change in the reluctance of the said circuit. In our invention we use two balanced, differential, alternating current circuits and the variations in the measurements of the machined part under inspection causes a change in the reluctance of one of the circuits which results in deflections on a direct current ammeter supplied with current through a small rectifier.

Our invention will be best understood from the following description considered in connection with the accompanying drawings while the features of our invention which are believed to be novel and patentable are pointed out in the claims appended hereto.

Fig. 1 represents a typical curve of the resultant voltage plotted against the ratio of the impedances of the two circuits of a differentially balanced alternating current circuit (as shown for example in Fig. 2) the impedances being adjusted to give zero resultant voltage at line frequency. Fig. 2 represents a diagram of connections of a differentially balanced alternating current circuit that may and has been successfully used with our electric gauge. Fig. 3 represents a cross-sectional view of our electric gauge. Fig. 4 represents an enlarged end view at the plane 4—4 in Fig. 3. Fig. 5 represents an explanatory curve which will be referred to in describing our invention. Fig. 6 represents our invention under actual operating conditions when checking the internal diameter of a hole in a machined part. Fig. 7 represents a method that may be employed in connection with our invention for detecting minute inaccuracies in the dimension between the end and an internal shoulder of a machined part. Fig. 8 represents a modification of our electric gauge. Fig. 9 represents an enlarged view of the lower end of Fig. 8. Fig. 10 represents a method that may be employed in connection with our gauge to measure variations in outside diameters.

The following discussion will facilitate the understanding of our invention. It is obvious that in our electric gauge the use of alternating current is preferable to direct current because a change in the air gap of a magnetic circuit energized by alternating current causes a permanent change in the current strength. It is well known that every magnetic or non-magnetic mass has its own natural frequency of vibration and if a magnetic mass is a part of the magnetic circuit of an electromagnet energized by an alternating current whose frequency is nearly that of the natural frequency of vibration of the magnetic mass then the vibration of the magnetic mass will be influenced by the electromagnet. To avoid this we use an alternating current having a frequency much higher than the natural frequency of the moving part of our electric gauge and it follows that the moving part will move only in response to the variations in the measurement of the piece undergoing inspection. These variations in measurements may be indicated by an oscillograph operated by the alternating current employed in connection with the magnetic circuits of the gauge or preferably the alternating current can be rectified and connected to a direct current ammeter to show the variations in measurements. The advantages of using a direct current ammeter instead of an oscillograph are a smaller power consumption, a sharper defined indication and consequently less fatigue to the operator in observing the deflections of the needle.

It is well known to those skilled in the art that an alterating current circuit is considered to be in resonance when its inductance reaction and capacity reaction are equal. We obtain a condition resembling resonance by means of a differentially balanced alternating current circuit as shown for example in Fig. 2. In Fig. 1, A represents the resultant voltage plotted against the ratio of the impedances of the two circuits of the differentially balanced alterating current circuit. It can be seen that when the impedances of the two circuits have a ratio of 1.0 the two circuits are differentially balanced and the resultant voltage is zero as represented by B. It is apparent that if the impedance of only one circuit is changed or if the impedances of both circuits are changed in unequal amounts, the ratio of their impedances will be either above or below 1.0 and they will no longer be in differential balance and the resultant voltage will be above zero. For example if the ratio is decreased to .9 the resultant voltage will be represented by C, whereas if the ratio is increased to 1.2 the resultant voltage will be represented by D.

Referring to Fig. 2 which represents a diagram of connections of a differentially balanced alternating current circuit successfully employed with our invention, 10 represents a motor generator set for supplying the necessary power. The generator delivers single phase alterating current for example at 110 volts, 500 cycles, to the primary 12 of the transformer 11, 13 represents the transformer secondary which steps the 110 volts down to 10 volts. 14 and 15 represent two windings on the same core of the transformer 16. 17 and 18 represent what we have chosen to call the dummy and test coils respectively of our electric gauge, 19 represents a rectifying device to rectify the alternating current and 20 represents a direct current 500 microammeter whose needle will deflect the full scale when .0005 amperes flows through the microammeter. 21 and 22 represent the extreme ends of the windings 14 and 15. The windings 14 and 15 each have as nearly as possible the same resistance and inductive reactance, the reluctance of their magnetic circuits are not adjustable and the two windings are so connected as to oppose each other. The windings 17 and 18 each have as nearly as possible the same resistance and inductive reactance and the reluctance of their magnetic circuits are adjustable as shown in Fig. 3. Assuming equal magnetic reluctances as between windings 14 and 15 and as between windings 17 and 18 there will exist two differentially balanced alternating current circuits. One circuit consists of the transformer secondary 13 and windings 14 and 17 and the other circuit consists of the transformer secondary 13 and windings 15 and 18 and under this differentially balanced condition there will be no difference of potential between the points 21 and 22 and consequently the needle of the ammeter 20 should read substantially zero. At this condition the circuit is practically in balance and results in the minimum current to the ammeter 20, but if for example the magnetic reluctance of winding 18 is either increased or decreased the two circuits are no longer differentially balanced and a difference of potential exists between points 21 and 22 which causes a flow of alternating current through the rectifying device 19 causing the needle of the direct current ammeter 20 to deflect from its substantially zero position. To give a practical illustration the ammeter scale is 5 inches in length and divided into 5 equal divisions and a current of 500 microamperes (.0005 amperes) will deflect the needle of the ammeter the full scale.

Referring to Fig. 3 which represents a cross-sectional view of a preferred embodiment of our electric gauge, 17 and 18 represent the dummy and test coils respectively. 23 represents magnetic coil holders with fine screw threads at the top, these coil-holders also function as magnetic cores for coils 17 and 18. 24 and 25 respectively represent fine screw thread adjusting nuts and lock nuts for moving the coil holders 23 up and down and locking them in place. 27 represents caps made of magnetic material for holding coils 17 and 18 in place. 28 represents a stationary bar of magnetic material to function as part of the magnetic circuit of coil 17. 29 represents the case of the electric gauge. 30 represents a lever made of magnetic material pivoted at point 31 and as can be seen the left hand end of this lever is the armature 54 of the magnetic circuit of coil 18, whereas the right hand end of this lever carries a contact stud 32 in which is embedded a diamond point 33, the contact stud being secured to the lever by the set screw 34. Three springs represented by 35, 36 and 37 are shown and their tensions are adjusted so as to impart a balanced equilibrium condition to the lever 30 and yet make the action of the lever positive and lively in either direction so that the diamond point 33 will always follow the irregularities of the piece being measured. 38 represents adjusting nuts for adjusting the springs 35 and 36. Also 39 represents an adjustable set screw that can be locked in place by the lock nut 40, and 41 represents the non-magnetic cover of our electric gauge.

Fig. 4 represents an enlarged view of the plane 4—4 in Fig. 3. By referring to Figs. 3 and 4, to obtain a clear idea of the working of the mechanism it is seen that Fig. 4 shows 42, 43 and 44 which respectively represent the sapphire jewels, the clamp for holding these jewels in place and the screws 44 for fastening the clamp 43 to the gauging head 45. In Fig. 3 is shown 46 which represents a protecting end ring fastened to the gauging head 45. The ring 46 is ground to the same diameter as the sapphire jewels and is slightly below the diamond point 33, thus protecting the sapphire jewels from possible chipping as the machined pieces are rapidly slipped on and off for measurement and yet permit the diamond point 33 to follow the irregularities in the machined part. The sapphire jewels 42 are ground to a diameter which is approximately .005" over the diameter of the gauging head 45 to obtain a working clearance.

The following description considered in connection with Figs. 2, 3 and 4 should clearly illustrate the operation of our invention. We will first assume that we wish to measure irregularities in the bore of a machined part. The sapphire jewels are made the full length of the bore and expose wide contact areas to the bore and the diamond has an oval point. In actual operation the gauge is turned over so that the sapphire jewels are on the top and the diamond point is on the bottom, thus leaving the weight of the machined piece on the sapphire jewels and allowing the diamond point to freely follow irregularities in the bore, thereby changing the air gap between 54 and 23, thus changing the magnetic reluctance of coil 18. The two wide contact areas of the sapphire jewels straddle the point that is diametrically opposite the diamond point 33, thus insuring an unvarying position for the machined piece and resulting in accurate indications by the diamond point 33. As the sapphire jewels are of full length of the bore they will necessarily ride over any high point in the bore and cause the diamond point to move and thus the meter will indicate the amount and location of the high point. Also the diamond point is so located with respect to the machined piece that the piece can be turned end for end and measurements taken at two different places in the bore, thus checking the bore for taper and indicating its amount and direction. It is evident that the determination of the amount and location of the irregularities of a machined part is a necessary prerequisite to determine the proper steps to eliminate these irregularities and so produce highly accurate machined pieces which are necessary in present day scientifically designed machinery. After many exhaustive experiments with metals of various hardnesses we found that our invention became a practical success by the use of a diamond point and sapphire jewels with hardness ratings of 10 and 9 respectively. Many thousands of machined pieces have been inspected with our electric gauge without any detectable wear on the diamond point or sapphire jewels.

The actual operation of checking the machined pieces may be described as follows: Assuming it is desired that the bore of the machined pieces should be within the limits of .7512" and .7509", then two master test pieces are made with extreme care to insure perfect bores, one test piece having a .7512" bore and the other a .7509" bore. As the difference between .7512" and .7509" is .0003" we should adjust the calibration so that for every .0001" variation between the above limits the meter needle should deflect one inch. The .7509" test piece is rotated on the electric gauge and the air gap of the dummy coil 17 is adjusted by loosening lock nut 25 and turning the adjusting nut 24 which causes the coil holder 23 to move up or down until the ammeter needle indicates 1 and then the .7512" test piece is rotated on the electric gauge and the ammeter needle should read 4. If it reads above 4, the sensitivity of the electric gauge should be decreased by operating the armature 54 of the lever 30 in a weaker magnetic field which is accomplished by increasing the air gap of the test coil 18 by moving its coil holder 23 up by loosening the lock nut 25 and turning the adjusting nut 24. If the ammeter reads below 4 the sensitivity of the electric gauge should be increased by operating the armature 54 of the lever 30 in a stronger magnetic field which is accomplished by decreasing the air gap of the test coil 18 by moving its coil holder 23 down. The electric gauge is correctly set when the air gaps have been adjusted so that the ammeter needle reads 1 for the .7509" test piece and 4 for the .7512" test piece. As the ammeter takes .0005 amperes to deflect the full scale of 5 inches, therefore every inch will require .0001 amperes and a half inch movement will require .00005 amperes. A half inch movement on the meter is readily noticed and corresponds to .00005" variation, thus giving a very sensitive check.

The relation between the ammeter current, ammeter needle readings and the bore dimensions of the machined parts are represented in Fig. 5. The apparatus may of course be calibrated differently than as above described, the calibration varying with the requirements. If desired the instrument scale may be calibrated in the units being measured.

In Fig. 5 the point F corresponds to a bore of .7512", an ammeter current of .0004 amperes and an ammeter needle deflection of 4. The point G corresponds to a bore of .7509", an ammeter current of .0001 amperes and an ammeter needle deflection of 1. It is evident from the discussion accompanying Fig. 2 that if the bore measured is reduced to .7508", represented at point H, the ammeter needle deflection will be practically zero as the ammeter current is practically zero because our circuit is practically in balance. If the bore is reduced further, for example to .7507" represented at point I, the practical balance resonance of the circuit is destroyed and the ammeter current is .0001 amperes and the ammeter deflection will be 1 leading to the belief that this piece has a bore of .7509". To avoid this the set screw 39 in Fig. 3 is adjusted against the armature 54 of the lever 30 when the ammeter current is at its minimum which corresponds to a deflection which is practically zero on the needle.

It is evident that if a greater sensitivity of the electric gauge is desired this can be obtained by operating the armature 54 of the lever 30 in a stronger magnetic field of the test coil 18 or by increasing the ratio of the long end to the short end of the lever 30. A lesser sensitivity is obtained by operating the armature 54 of the lever 30 in a weaker magnetic field of the test coil 18 or by decreasing the ratio of the long end to the short end of the lever 30. The lever 30 shown in Fig. 3 and the gauging head 45 shown in Fig. 4 are removable as a unit and a lever having a different ratio can be assembled using the same or another gauging head.

Fig. 6 represents our electric gauge in actual operation, while checking the internal diameter of a hole in a machined piece. The operator revolves the machined piece R and watches the deflection of the needle on the ammeter directly opposite. It is evident that inspection can be made by an inexperienced operator with great rapidity, accuracy, minimum of fatigue and independent of the sense of touch. Only 5 watts are necessary to operate an electric gauge such as we have described. It is evident that many such gauges can be operated from a single small motor generator set of 250 watts generator capacity for example and thus the investment cost per gauge can be reduced.

The following description will illustrate some of the additional checks that can be made by our electric gauge. As shown in Fig. 10 the variations in the diameter of a machined or ground part represented by 63 is measured by placing the part 63 on sapphire jewels 64 secured in a V-shaped block represented by 65. The diamond point 33 should preferably have a flat end so that it will be more certain to come in contact with the exact top of the machined piece. As the piece is rotated the diamond point 33 will follow the irregularities in the diameter and the ammeter needle will deflect accordingly.

To measure variations in the thickness of flat machined or ground pieces they are placed on sapphire jewels embedded in a steel plate. The diamond should preferably have an oval point so it will be more certain to follow irregularities. As the machined pieces are rotated or moved in any desired direction the diamond point will follow the irregularities and the ammeter needle will deflect accordingly.

In industry there are many pieces machined as represented by N in Fig. 7 and which must have the dimension represented from the shoulder J to the bottom face K within close limits.

If a gauging cylinder represented by P in Fig. 7 has its faces L and M perfectly parallel and has its face M placed on the shoulder J, any variation in the distance between J and K will be directly reflected in the measurement between K and L. The diamond point 33 of our gauge which may be flat or oval shaped, though the latter is preferable, will be raised or lowered by these variations in measurments and the ammeter needle will deflect accordingly.

Undoubtedly many other checks can be made with our electric gauge and these checks will suggest themselves to those who are acquainted with precision inspection. The above described method of checking the pieces represented in Fig. 7 requires several operations and since modern industry may involve great quantities of such pieces it becomes desirable to check these parts with a minimum of effort which is accomplished by the modification of our electric gauge represented in Fig. 8.

In Fig. 8 like parts to those shown in Fig. 3 are similarly numbered and hence need not be again described. The coils 17 and 18 are not shown but they are assembled on the cores 23 as shown in Fig. 3. The remaining parts may be described as follows: In Fig. 8, 47 represents non-magnetic screws for securing the cover 41 to the case 29 which has a reamed hole 48 and a keyway 49. The movable element consists of a solid shaft 50 made of magnetic material having an armature 51 which is integral with the shaft 50. The shaft 50 also has a key 52 fastened by a screw 53 and there is also a double-faced collar 54 shrunk on the shaft. The enlarged view shown in Fig. 9 clearly shows that the end of the shaft 50 has two sapphire jewels 58 fastened by the clamp 59 and the screw 60. To protect these jewels from damage there is provided a protecting sleeve 61 and a retaining nut 62 for the sleeve. The sleeve 61 has a sliding fit and gravity keeps it at its lowest position, thus forming a protecting chamber for the sapphire jewels. Returning to Fig. 8, a close running fit is provided between 48 and 50 and they are made of sufficient length to preclude tilting of the armature 51. The key 52 slides in the keyway 49 to prevent angular motion of the armature 51. The machined parts rest on a hardened flat steel table plate and they are checked by inserting the electric gauge so that the shoulder 55 of the part 29 in Fig. 8 rests on the shoulder J of the part N shown in Fig. 7.

When thus assembled the distance between the shoulder 55 and the face 56 of the case 29 of Fig. 8 is less than the distance between the shoulder J and the face K of the part N shown in Fig. 7 so that the face 56 will not touch the table plate. Also the shaft 50 is of such length that the sapphire jewels 58 touch the table plate before the lower shoulder of the collar 54 touches the shoulder 57 of the case 29 of Fig. 8. The machined pieces can be rapidly checked by inserting the electric gauge in one piece after another and noting the ammeter deflection. The spring 36 normally keeps the sapphire jewels 58 at their lowest point and as the electric gauge is inserted the sapphire jewels 58 come in contact with the table plate the protecting sleeve 61 readily sliding up, and the variation in the upward movement of the shaft 50 will depend on the variation of the distance between the shoulder J and the face K of the part N shown in Fig. 7. These variations will be directly reflected in the air gap between the coil holder 23 of the test coil 18 and the armature 51 and the ammeter needle will be deflected accordingly.

While we have described our invention in connection with a motor generator set delivering single phase alternating current at 110 volts and 500 cycles, and a diagram of connections as shown in Fig. 2 and the use of a rectifying device and a direct current ammeter and with checks on machined pieces of certain shapes, yet we intend all the foregoing matter to be interpreted as illustrative of our invention and not as limiting the scope of our invention.

In accordance with the provisions of the patent statutes we have described the principles of operation of our invention together with the apparatus which we now consider to represent the best embodiment thereof, but we desire to have it understood that all modifications falling fairly within the true spirit and scope of our invention are intended to be included within the scope of the appended claims.

What we claim as new and desire to secure by Letters Patent of the United States, is,—

1. An electromagnetic gauge for measuring variations in the length between two shoulders on machined parts and the like, the said gauge comprising a casing provided with an extension, said extension having two peripheral surfaces of different dimensions connected by a shoulder, the last mentioned shoulder being adapted to engage one of the shoulders on the part being checked, a Wheatstone bridge having four arms, at least one of said arms containing an electromagnet supported by said casing, a movable magnetic armature for said electromagnet, a movable rod slidably mounted in said extension for moving said magnetic armature toward and from said electromagnet, said rod protruding beyond said extension so as to engage a surface which is below the surface engaged by the shoulder on said extension, an electrical instrument, and connecting means between said Wheatstone bridge and said instrument for impressing on the latter a voltage whose magnitude is responsive to the difference of potential across the Wheatstone bridge, caused by an unbalance thereof.

2. An electromagnetic gauge for measuring variations in the length between two shoulders on machined parts and the like, the said gauge comprising a casing provided with a cylindrically shaped extension, said extension having a recess at its lower end and two peripheral surfaces of different diameters connected by a shoulder, the last mentioned shoulder being adapted to engage one of the shoulders on the part being checked, a Wheatstone bridge having four arms, two of said arms containing each an electromagnet supported by said casing, a movable rod slidably mounted in said extension for movement toward and from said electromagnets, a movable magnetic armature for one of said electromagnets, said magnetic armature being secured to the top end of said rod, the lower end of said rod protruding beyond said extension so as to engage a surface which is below the surface engaged by the shoulder on said extension, a stationary magnetic armature for the other electromagnet, hardened surface contact means secured to the lower end of said rod, a movable open ended casing surrounding a portion of said rod adjacent to its lower end, said open ended casing having a flange, means for confining the movement of said flange within said recess, means for limiting the movement of said movable magnetic armature toward its electromagnet, an electrical indicating instrument, and connecting means between said Wheatstone bridge and said instrument for impressing on the latter a voltage whose magnitude is responsive to the difference of potential across the Wheatstone bridge, caused by an unbalance thereof.

3. An electromagnetic device for measuring minute variations in the dimensions of a machined part or the like, the said device comprising a Wheatstone bridge circuit having an electromagnet connected in one of its arms, an electrical instrument, connecting means between said Wheatstone bridge and said instrument for impressing on the latter a voltage whose magnitude is responsive to the difference of potential across the bridge, caused by an unbalance thereof, a movable contact member for engaging the surface of the part being checked, said contact member moving in response to a variation in the dimension of the part being checked, and means responsive to a movement of said contact member for effecting a change in the impedance of said electromagnet, thereby changing the voltage impressed on said instrument in response to a variation in the dimension of the part being checked.

4. An electromagnetic device for measuring minute variations in the dimensions of a machined part or the like, the said device comprising a Wheatstone bridge circuit having an electromagnet connected in one of its arms, a movable magnetic member so disposed as to form a part of the magnetic circuit of said electromagnet and by its movement to effect a change in the reluctance of this magnetic circuit, an electrical instrument, connecting means between said Wheatstone bridge and said instrument for impressing on the latter a voltage whose magnitude is responsive to the difference of potential across the bridge, caused by an unbalance thereof, a movable contact member for engaging the surface of the part being checked, said contact member moving in response to a variation in the dimension of the part being checked, and means for moving said magnetic member in response to a movement of said contact member, thereby changing the voltage impressed on said instrument in response to a variation in the dimension of the part being checked.

5. An electromagnetic device for measuring variations in the dimensions of machined parts and the like, the said device comprising a Wheatstone bridge circuit consisting of four arms connected in series, with at least one of said arms including an electromagnet, said bridge circuit to be energized by alternating current, an electrical instrument, connecting means between said Wheatstone bridge and said instrument for impressing on the latter a voltage whose magnitude is responsive to the difference of potential across the bridge, caused by an unbalance thereof, means for varying the impedance of at least one of said arms to obtain a desired indication on said instrument, a movable gauging member adapted to change its position in accordance with variations in the dimension of the part being checked, and means for effecting a change in the impedance of said electromagnet in response to a change in the position of said gauging member, thereby changing the indication of said instrument in response to said variations.

6. An electromagnetic device for measuring variations in the dimensions of machined parts and the like, the said device comprising a casing provided with an extension, two electromagnets mounted on said casing, a Wheatstone bridge circuit having said electromagnets respectively connected in two of its arms, said bridge circuit to be energized by alternating current, an electrical instrument, connecting means between said Wheatstone bridge and said instrument for impressing on the latter a voltage whose magnitude is responsive to the difference of potential across the bridge, caused by an unbalance thereof, a movable magnetic armature so disposed as to form a part of the magnetic circuit of at least one of said electromagnets, and by its movement to effect a change in the relative reluctances of the magnetic circuits of said two electromagnets, a movable gauging member in said extension to cooperate therewith for measuring the dimension of the part being checked, said gauging member being adapted to change its position in accordance with variations in the dimension of the part being checked, and means for changing the position of said magnetic armature in response to a change in the position of said gauging member, thereby changing the indication of said instrument in response to said variations.

7. An electromagnetic device for measuring variations in the dimensions of machined parts and the like, the said device comprising a casing provided with an extension, two magnetic cores adjustably mounted on said casing, a coil surrounding each of said cores, a Wheatstone bridge circuit having said coils respectively connected in two of its arms, said bridge circuit to be energized by alternating current, an electrical indicating instrument, connecting means between said Wheatstone bridge and said instrument for impressing on the latter a voltage whose magnitude is responsive to the difference of potential across the bridge, caused by an unbalance thereof, a stationary magnetic armature adjacent to one of said cores, a movable element pivoted in said extension, one end of said element acting as a movable magnetic armature adjacent to the other of said cores, and the other end of said element cooperating with said extension to engage the surface of the part being checked, and resilient means associated with said pivoted movable element for effecting a change in the position of said movable magnetic armature in response to a change in the dimension of the part being checked, thereby changing the indication of said instrument in response to said variations.

8. An electromagnetic device for measuring variations in the dimensions of machined parts and the like, the said device comprising a casing, two magnetic cores adjustably mounted on said casing, a coil surrounding each of said cores, a Wheatstone bridge circuit having said coils respectively connected in two of its arms, said bridge circuit to be energized by alternating current, an electrical indicating instrument, connecting means between said Wheatstone bridge and said instrument for impressing on the latter a voltage whose magnitude is responsive to the difference of potential across the bridge, caused by an unbalance thereof, a stationary magnetic armature adjacent to one of said cores, a stationary circular gauging head removably secured to said casing, a movable element pivoted in said head, one end of said element acting as a magnetic armature adjacent to the other of said cores, and the opposite end of said element cooperating with said head to engage the part being checked, hardened means secured to said gauging head and said opposite end of the pivoted movable element for making contact with the surface of the part being checked, resilient means associated with said pivoted movable element for effecting a change in the position of said movable magnetic armature in response to a change in the dimension of the part being checked, thereby changing the indication of said instrument in response to said variations, and a circular protecting ring secured to said gauging head, said ring having substantially the same diameter as the gauging head with its hardened means, thereby protecting the last mentioned hardened means from injury as the part to be checked is slipped on and off the gauging head.

9. An electromagnetic device for measuring variations in the dimensions of machined parts and the like, the said device comprising a Wheatstone bridge circuit consisting of four arms connected in series, with at least one of said arms including an electromagnet, said bridge circuit to be energized by alternating current, an electrical measuring circuit connected across two opposite terminals connecting said arms, there being two parallel paths between said terminals, with each path consisting of two arms connected in series, an electrical instrument included in said measuring circuit, means for manually varying the impedance of at least one of said arms to obtain a desired indication on said instrument, a movable magnetic member so disposed as to form a part of the magnetic circuit of said electromagnet and by its movement to effect a change in the reluctance of this magnetic circuit, a movable gauging member adapted to change its position in accordance with variations in the dimension of the part being checked, and means for changing the position of said magnetic member in response to a change in the position of said gauging member, thereby changing the indication of said instrument in response to said variations.

ALFRED V. MERSHON.
BENJAMIN C. WAITE, JR.